(12) United States Patent
Zhao et al.

(10) Patent No.: US 12,526,774 B2
(45) Date of Patent: Jan. 13, 2026

(54) SIDELINK RESOURCE INDICATION INFORMATION DETERMINATION METHOD, FIRST TERMINAL DEVICE, AND SECOND TERMINAL DEVICE

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN); Huei-Ming Lin, Taipei (TW); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 311 days.

(21) Appl. No.: 18/217,024

(22) Filed: Jun. 30, 2023

(65) Prior Publication Data

US 2023/0345426 A1 Oct. 26, 2023

Related U.S. Application Data

(63) Continuation of application No. PCT/CN2021/070133, filed on Jan. 4, 2021.

(51) Int. Cl.
*H04W 72/04* (2023.01)
*H04W 72/563* (2023.01)

(52) U.S. Cl.
CPC ......... *H04W 72/04* (2013.01); *H04W 72/563* (2023.01)

(58) Field of Classification Search
CPC . H04W 72/04; H04W 72/563; H04W 72/042; H04W 72/20; H04W 72/044;
(Continued)

(56) References Cited

U.S. PATENT DOCUMENTS

2013/0084877 A1 4/2013 Martin et al.
2021/0250924 A1* 8/2021 Ji ..................... H04W 72/23
(Continued)

FOREIGN PATENT DOCUMENTS

CN 108633027 A 10/2018
CN 109587260 A 4/2019
(Continued)

OTHER PUBLICATIONS

WO_2020088141_A1 (Year: 2020).*
(Continued)

*Primary Examiner* — Rushil P. Sampat
(74) *Attorney, Agent, or Firm* — BAYES PLLC

(57) ABSTRACT

The present application relates to a resource determination method, a first terminal device, a second terminal device, a chip, a computer readable storage medium, a computer program product, and a computer program. The method includes: a first terminal device sends first indication information to a second terminal device, wherein the first indication information is used for indicating a resource set, and the resource set is determined on the basis of resource attribute information, and the resource set is used for determining a transmission resource of the second terminal device.

20 Claims, 6 Drawing Sheets

UE-C second indication information

UE-B

UE-A resource set

(58) Field of Classification Search
CPC ..... H04W 72/23; H04W 76/14; H04W 92/18; H04W 72/02; H04L 5/0055; H04L 5/0094; H04L 5/0023
See application file for complete search history.

(56) References Cited

U.S. PATENT DOCUMENTS

| | | | |
|---|---|---|---|
| 2021/0298030 A1* | 9/2021 | Li | H04L 5/0048 |
| 2022/0394710 A1* | 12/2022 | Li | H04W 72/0446 |
| 2023/0039093 A1* | 2/2023 | Xiang | H04W 24/08 |
| 2023/0344610 A1* | 10/2023 | Yang | H04W 40/20 |

FOREIGN PATENT DOCUMENTS

| | | |
|---|---|---|
| CN | 111246483 A | 6/2020 |
| WO | 2020014985 A1 | 1/2020 |

OTHER PUBLICATIONS

WO_2021159511_A1 (Year: 2021).*
International Search Report issued in international application No. PCT/CN2021/070133, mailed Sep. 28, 2021.
Written Opinion of the International Searching Authority issued in international application No. PCT/CN2021/070133, mailed Sep. 28, 2021.
LG Electronics, "Discussion on feasibility and benefits for mode 2 enhancement", R1-2007896, 3GPP TSG RAN WG1 Meeting#103-e e-Meeting, Oct. 26-Nov. 13, 2020.
Extended European Search Report issued in corresponding European application No. 21912412.0, mailed Oct. 16, 2023.
Source: CATT; Title: Discussion on feasibility and benefits for mode 2 enhancements 3GPP TSG RAN WG1 meeting #103-e R1-2007834 e-Meeting, Oct. 26-Nov. 13, 2020.
Source: OPPO; Title: Inter-UE coordination in mode 2 of NR sidelink 3GPP TSG RAN WG1 #103-e R1-2009319 e-Meeting, Oct. 26-Nov. 13, 2020.

* cited by examiner

SIDELINK RESOURCE INDICATION INFORMATION DETERMINATION METHOD, FIRST TERMINAL DEVICE, AND SECOND TERMINAL DEVICE

CROSS-REFERENCE TO RELATED APPLICATION

The present application is a continuation of International Application No. PCT/CN2021/070133, filed on Jan. 4, 2021, which is incorporated herein by reference in its entirety.

TECHNICAL FIELD

The present application relates to the communication field, and more specifically, relates to a resource determination method, a first terminal device, a second terminal device, a chip, a computer-readable storage medium, a computer program product and a computer program.

BACKGROUND

Device to Device (D2D) communication technology, which is different from the way of receiving or sending communication data through network device in traditional cellular systems, supports direct communication between two user devices, therefore, it has higher spectrum efficiency and lower transmission delay.

Generally, a terminal device in a D2D communication system can perform data transmission on a side link (Sidelink, SL) based on the resources allocated by the network device, or independently select resources from a pre-configured resource pool, and perform data transmission on the sidelink based on the selected resources.

SUMMARY

In view of this, an embodiment of the present application provides a method for determining resources, a first terminal device, a second terminal device, a chip, a computer-readable storage medium, a computer program product, and a computer program.

The embodiment of the present application provides a resource determination method, including:
  sending, by a first terminal device, first indication information to a second terminal device;
  wherein, the first indication information is used to indicate a resource set, the resource set is determined based on resource attribute information, and the resource set is used to determine a transmission resource of the second terminal device.

The embodiment of the present application provides a resource determination method, including:
  receiving, by a second terminal device, first indication information sent by a first terminal device; wherein, the first indication information is used to indicate a resource set; the resource set is determined by the first terminal device based on resource attribute information; and
  determining, by the second terminal device, a transmission resource of the second terminal device according to the resource set.

The embodiment of the present application also provides a first terminal device, including:
  a first communication module, configured to send first indication information to a second terminal device; wherein, the first indication information is used to indicate a resource set, the resource set is determined based on resource attribute information, and the resource set is used to determine a transmission resource of the second terminal device.

The embodiment of the present application also provides a second terminal device, including:
  a second communication module, configured to receive first indication information sent by a first terminal device; wherein, the first indication information is used to indicate a resource set; the resource set is determined by the first terminal device based on resource attribute information; and
  a third processing module, configured to determine a transmission resource of the second terminal device according to the resource set.

The embodiment of the present application also provides a first terminal device, including: a processor and a memory, the memory is used to store a computer program, and the processor invokes and runs the computer program stored in the memory to execute the above resource determination method.

The embodiment of the present application also provides a second terminal device, including: a processor and a memory, the memory is used to store a computer program, and the processor invokes and runs the computer program stored in the memory to execute the above resource determination method.

The embodiment of the present application also provides a chip, including: a processor, configured to invoke and run a computer program from a memory, so that a device equipped with the chip executes the above resource determination method.

The embodiment of the present application further provides a computer-readable storage medium for storing a computer program, wherein the computer program causes a computer to execute the above resource determination method.

The embodiment of the present application further provides a computer program product, including computer program instructions, wherein the computer program instructions cause a computer to execute the above resource determination method.

The embodiment of the present application further provides a computer program, which enables a computer to execute the above resource determination method.

DETAILED DESCRIPTION

Figure 1A:
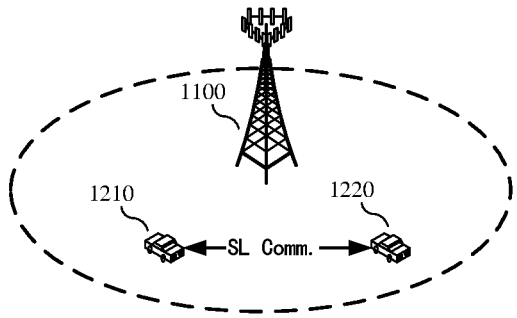
FIG. 1A is a schematic diagram of sidelink communication within network coverage according to an embodiment of the present application.

Hereinafter, the implementations in the embodiments of the present application will be described with reference to the drawings in the embodiments of the present application.

It should be understood that the terms "system" and "network" are often used interchangeably herein. The term "and/or" in this article is an association relationship describing associated objects, which means that there can be three relationships for the related objects, for example, A and/or B can mean these three situations: A exists alone, A and B exist simultaneously, and B exists alone. The character "/" in this article generally indicates that the contextual objects are an "or" relationship.

It should be understood that the "indication" mentioned in the embodiments of the present application may be a direct indication, may also be an indirect indication, and may also mean that there is an association relationship. For example, A indicates B, which can mean that A directly indicates B, for example, B can be obtained through A; it can also indicate that A indirectly indicates B, for example, A indicates C, and B can be obtained through C; it can also indicate that there is an association relationship between A and B.

In the description of the embodiments of the present application, the term "corresponding" may indicate that there is a direct or indirect correspondence between the two, or that there is an association between the two, or the relation of indicating and being indicated, configuring and being configured, or the like.

The technical solutions of the embodiments of the present application can be applied to various communication systems, for example: Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced long term evolution (LTE-A) system, New Radio (NR) system, LTE-based access to unlicensed spectrum, (LTE-U) system, NR-based access to unlicensed spectrum (NR-U) system, Non-Terrestrial Networks (NTN) system, Universal Mobile Telecommunications System (UMTS), Wireless Local Area Networks (WLAN), Wireless Fidelity (WiFi), fifth-generation communication (5th-Generation, 5G) system or other communication systems, etc.

In the communication system of the embodiments of the present application, the terminal device may also be referred to as user equipment (UE), access terminal, user unit, user station, mobile station, mobile site, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, a Personal Digital Assistant (PDA) device, handheld devices with wireless communication functions, computing devices or other processing devices connected to wireless modems, vehicle-mounted devices, wearable devices, next-generation communication systems such as terminal devices in NR networks, or the terminal device in a future evolved public land mobile network (PLMN) network, etc.

In the embodiment of this application, the terminal device can be deployed on land, including indoor or outdoor, handheld, wearable or vehicle-mounted; the terminal device can also be deployed on water (such as ships, etc.); the terminal device can also be deployed in the air (such as aircraft, balloons and satellites).

In this embodiment of the application, the terminal device may be a mobile phone, a tablet computer (Pad), a computer with a wireless transceiver function, a virtual reality (VR) terminal device, an augmented reality (AR) terminal device, wireless terminal devices in industrial control, wireless terminal devices in self driving, wireless terminal devices in remote medical, wireless terminal devices in smart grid, wireless terminal device in transportation safety, wireless terminal device in smart city, or wireless terminal device in smart home.

As an example but not a limitation, in this embodiment of the present application, the terminal device may also be a wearable device. Wearable devices can also be called wearable smart devices, which is a general term for the application of wearable technology to intelligently design daily wear and develop wearable devices, such as glasses, gloves, watches, clothing and shoes. A wearable device is a portable device that is worn directly on the body or integrated into the user's clothing or accessories. Wearable devices are not only a hardware device, but also achieve powerful functions through software support, data interaction, and cloud interaction. Generalized wearable smart devices include those of full-featured, large-sized, complete or partial functions without relying on smart phones, such as smart watches or smart glasses, etc., and those only focus on a certain type of application functions, and need to cooperate with other devices such as smart phones, such as various smart bracelets and smart jewelry for physical sign monitoring.

In the embodiment of this application, the network device may be a device used to communicate with mobile devices, and the network device may be an access point (AP) in WLAN, a base transceiver station (BTS) in GSM or CDMA, or a base station (NodeB, NB) in WCDMA, or an evolved base station (Evolutional Node B, eNB or eNodeB) in LTE, or a relay station or an access point, or a vehicle-mounted device, a wearable device, and a network device (gNB) in an NR network, or the network device in the future evolution of the PLMN network, etc.

As an example but not a limitation, in this embodiment of the present application, the network device may have a mobile feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station installed on land, water, and other locations.

In this embodiment of the application, the network device may provide services for a cell, and the terminal device communicates with the network device through the transmission resources (for example, frequency domain resources, or spectrum resources) used by the cell. The cell may be a cell corresponding to a network device (e.g., a base station), the cell may belong to a macro base station, or a base station corresponding to a small cell, wherein the small cell may include: Metro cell, Micro cell, Pico cell, Femto cell, etc. These small cells have the characteristics of small coverage and low transmission power, and are suitable for providing high-speed data transmission services.

Generally speaking, the number of connections supported by traditional communication systems is limited and easy to implement. However, with the development of communication technology, mobile communication systems will not only support traditional communication based on the network device, but also support, for example, Device to Device (D2D) communication, Machine to Machine (M2M) communication, Machine Type Communication (MTC), Vehicle to Vehicle (V2V) communication, or Vehicle to everything (V2X) communication, etc., the embodiments of the present application may also be applied to these communication systems.

According to the network coverage of the device in the sidelink communication, the sidelink communication can be classified into the sidelink communication in coverage, the sidelink communication in partial coverage and the sidelink communication out of coverage.

As shown in FIG. 1A, in the sidelink communication in coverage, all devices performing side communication, such as terminal devices 1210 and 1220, are located within the coverage of the same network device 1100. Therefore, all devices performing sidelink communication can perform sidelink communication based on the same sidelink configuration by receiving configuration signaling from the network device.

Figure 1B:
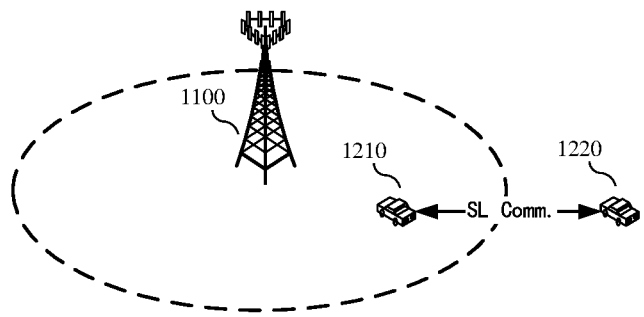
FIG. 1B is a schematic diagram of sidelink communication with partial network coverage according to an embodiment of the present application.

As shown in FIG. 1B, in the sidelink communication in partial coverage, some device performing sidelink communication, such as the terminal device 1210, is located within the coverage of network device 1100, and can receive the configuration signaling of the network device, and perform sidelink communication according to the configuration of the network device. In addition, some device performing sidelink communication, such as the terminal device 1220, is located outside the coverage of the network device 1100, and cannot receive the configuration signaling of the network device. In this case, the device outside the coverage of network device 1100 will perfume the sidelink configuration using the pre-configuration information and the indication information carried by the Physical Sidelink Broadcast Channel (PSBCH) sent by the device within the network coverage, and perform sidelink communication based on the sidelink configuration.

Figure 1C:
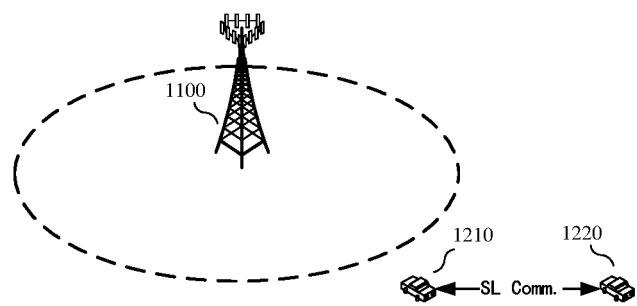
FIG. 1C is a schematic diagram of sidelink communication without network coverage according to an embodiment of the present application.

As shown in FIG. 1C, in the sidelink communication out of coverage, all devices performing sidewalk communication, such as device 1210 and device 1220, are located outside the coverage of network device 1100. All devices performing sidelink communication determine the sidelink configuration according to the pre-configuration information, and perform sidelink communication based on the sidelink configuration.

The V2X system is a D2D-based sidelink communication system with high spectral efficiency and low transmission delay. Taking the V2X system as an example, based on the D2D communication method, the following modes can be used to determine transmission resources:

The first mode: the network device allocates transmission resources of the terminal device, and the terminal device transmits data on the sidelink according to the resources allocated by the network device. The network device may allocate resources for a single transmission to the terminal device, and may also allocate resources for semi-static transmission to the terminal device. Taking the sidelink communication within the network coverage shown in FIG. 1A as an example, the terminal device 1210 and/or 1220 are located within the coverage of the network device 1100, and the network device 1100 allocates the resource for sidelink transmission for the terminal device 1210 and/or 1220.

The second mode: the terminal device selects resources from the resource pool, and transmits data based on the selected resources. Taking the sidelink communication outside the network coverage shown in FIG. 1C as an example, the terminal device 1220 is located outside the coverage of the cell, and the terminal device 1220 autonomously selects transmission resources from the pre-configured resource pool for sidelink transmission. Alternatively, taking the sidelink communication within the network coverage shown in FIG. 1A as an example, the terminal device 1210 and/or 1220 autonomously selects resources from the resource pool configured by the network device 1100.

Hereinafter, taking the NR-V2X system as an example, the data transmission method in D2D communication and the sidelink control information (SCI) mechanism is introduced firstly, and then the problems of the terminal device in D2D communication determining transmission resource based on the above second mode is explained.

In NR-V2X, autonomous driving needs to be supported, so higher requirements are placed on data interaction between vehicles, such as higher throughput, lower latency, higher reliability, and greater coverage, more flexible resource allocation, etc. In LTE-V2X, broadcast transmission is supported between terminal devices, that is, between vehicles. In NR-V2X, unicast and multicast transmission methods are introduced to meet higher data interaction requirements.

Figure 2A:
FIG. 2A is a schematic diagram of unicast transmission according to an embodiment of the present application.

In unicast transmission, the number of data receiver is 1. As shown in FIG. 2A, unicast transmission is performed between UE1 and UE2. The receiving end of the data sent by UE1 only includes UE2; the receiving end of the data sent by UE2 only includes UE1.

Figure 2B:
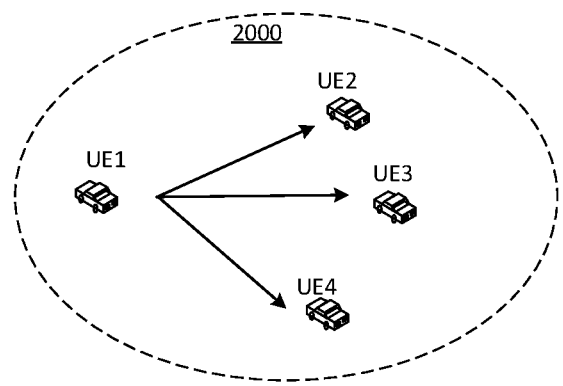
FIG. 2B is a schematic diagram of multicast transmission according to an embodiment of the present application.

In multicast transmission, the receiving end of data includes all terminal devices except the sending end in the communication group where the sending end is located, or includes all terminal devices within a certain transmission distance. As shown in FIG. 2B, UE1, UE2, UE3 and UE4 are located in the same communication group 2000. The receiving end of the multicast data sent by UE1 includes all terminal devices in the communication group 2000 except UE1, that is, UE2, UE3 and UE4.

Figure 2C:
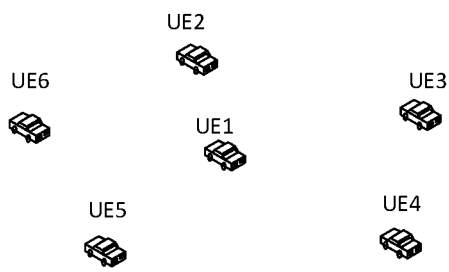
FIG. 2C is a schematic diagram of broadcast transmission according to an embodiment of the present application.

In broadcast transmission, the receiving end of data includes any terminal device around the sending end. As shown in FIG. 2C, the receivers of the broadcast data sent by UE1 include other terminal devices UE2, UE3, UE4, UE5 and UE6 around UE1.

Figure 3:
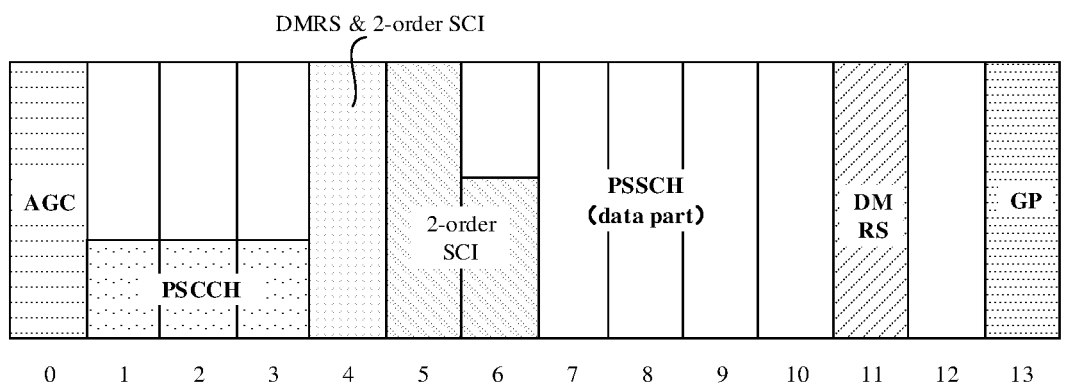
FIG. 3 is a schematic diagram of the frame structure of the PSCCH and the PSSCH according to the embodiment of the present application.

In NR-V2X, the 2-order SCI is introduced. Wherein, the first-order SCI is carried by the physical sidelink control channel (PSCCH), and is used to indicate the information of the physical sidelink shared channel (PSSCH) such as the transmission resource, reserved resource information, modulation and coding scheme (MCS) level, priority and the like. The second-order SCI is sent in the resources of the PSSCH, and is demodulated using the demodulation reference signal (DMRS) of the PSSCH. It is used to indicate the information for data demodulation such as the sender identifier (ID), the receiver ID, the hybrid automatic repeat request (HARQ) ID, the new data indicator (NDI), and the like. The second-order SCI is mapped from the first DMRS symbol of the PSSCH, and the mapping order is: first frequency domain mapping, and then time domain mapping. As shown in FIG. 3, in the frame structure of PSCCH and PSSCH, symbol 0 is used for automatic gain control (AGC). The PSCCH occupies symbols 1, 2 and 3, and the DMRS of the PSSCH occupies symbols 4 and 11. The second-order SCI is mapped from the first DMRS symbol, that is, symbol 4, and is frequency-division multiplexed with the DMRS on symbol 4. The second-order SCI is mapped to symbols 4, 5 and 6, and the size of resources occupied thereby depends on the number of bits of the second-order SCI.

Figure 4:
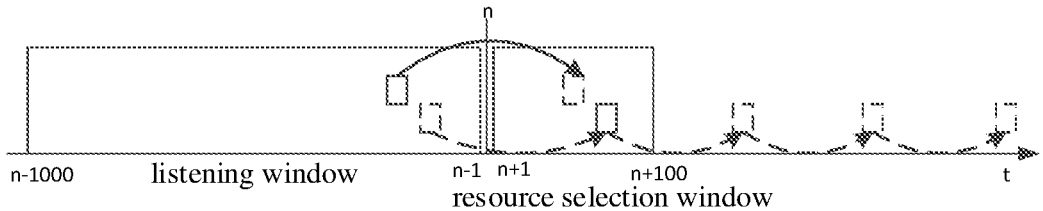
FIG. 4 is a schematic diagram of a listening window and a resource selection window according to an embodiment of the present application.

In the case where the NR-V2X terminal device adopts the above-mentioned second mode, that is, when the terminal device independently selects transmission resources in the resource pool pre-configured or configured by the network device, the terminal device selects resources according to the listening result. Specifically, as shown in FIG. 4, when a new data packet arrives in time slot n, the terminal device needs to select resources. The terminal device will select a resource within a period of time after the time slot n (hereinafter referred to as the resource selection window) according to the listening result of a period of time before the time slot n (hereinafter referred to as the listening window). Specifically, the listening window of the terminal device may be a time slot range $[n-T_0, n-T_{proc,0})$, and the resource selection window may be a time slot range $[n+T_1, n+T_2]$. In FIG. 4, $T_0=1000$, $T_{proc,0}=1$, $T_1=1$, $T_2=100$ is taken as an example. In practical application, $T_0$ is configured by high-level signaling, and is used to determine the starting position of the listening window;

$T_{proc,0}$ is determined by the processing capability of the terminal device;

$0 \leq T_1 \leq T_{proc,1}$; and the upper limit $T_{proc,1}$ of $T_1$ is determined by the processing capability of the terminal device;

$T_{2min} \leq T_2 \leq T_{2max}$, $T_{2min}$ and $T_{2max}$ are respectively the lower limit value and the upper limit value of $T_2$, wherein, $T_{2max}$ may be the remaining packet delay budget (PDB).

The process of terminal device selecting resources in the resource selection window includes:

Step 1: The terminal device obtains a candidate resource set A based on all resources in the resource selection window.

Step 2: If the terminal device has no listening result on the first subframe in the listening window, the resource on the second subframe corresponding to the first subframe in the resource selection window is deleted from the set A.

Step 3: If the terminal device detects the PSCCH within the listening window, the terminal device measures the reference signal received power (RSRP) of the PSCCH or the RSRP of the PSSCH scheduled by the PSCCH. If the measured RSRP is higher than the RSRP threshold, and according to the reservation information in the PSCCH, it is determined that there is a resource conflict between the transmission resources reserved in the resource selection window and the data to be transmitted by the terminal device, the terminal device deletes from set A the resource in the resource selection window. Wherein, the selection of the RSRP threshold is determined based on the priority information carried in the detected PSCCH and the priority of the data to be transmitted of the terminal device.

Step 4: When the amount of remaining resources in set A is less than X % of the total amount of resources in the resource selection window, the terminal device increases the threshold value of RSRP, for example, by 3 dB, and repeats the above step 2 until the remaining resources in set A is greater than X % of the total amount of resources, and the set A at this time is determined as an available resource set (or referred to as a candidate resource set). Wherein, X is a parameter configured by a higher layer.

Step 5: The physical layer of the terminal device reports the available resource set to the high layer of the terminal device, and the high layer randomly selects at least one transmission resource from the available resource set reported by the physical layer for sidelink transmission.

The above resource selection method has the following problems:

Problem 1. Half-Duplex Problem:

For example, the terminal device UE-A selects a certain resource on the time slot n, and performs sidelink transmission based on the resource. The terminal device UE-B also selects a resource on time slot n, which is a different frequency domain resource from the resource selected by UE-A. Due to the limitation of half-duplex communication, UE-A cannot receive the data sent by UE-B on time slot n, and UE-B cannot receive the data sent by UE-A on time slot n. Therefore, if UE-B is the receiving end of UE-A, or conversely, UE-A is the receiving end of UE-B, neither UE-A nor UE-B can receive the data from the other party, resulting in a transmission failure.

Figure 5:
FIG. 5 is a schematic diagram of the hidden node problem of the embodiment of the present application.

Problem 2. Hidden Node Problem:

As shown in FIG. 5, the terminal device UE1 selects a transmission resource R according to the listening result, and sends sidelink data to the terminal device UE3 on the resource R. UE1 and the terminal device UE2 are far away from each other, and cannot detect the transmission resources selected or reserved by each other. UE2 also selects transmission resource R to transmit sidelink data. When UE2 is very close to UE3, the data transmission of UE2 on resource R will interfere with the data transmission of UE1 on resource R. This problem is called the hidden node problem.

In order to solve the above problems, an enhanced scheme to the second mode in which the terminal device independently selects resources from the resource pool is proposed. The enhancement scheme improves system performance through inter-UE coordination. Specifically, the first terminal device UE-A sends a resource set to the second terminal device UE-B, and UE-B performs resource selection according to the resource set sent by UE-A.

For example, UE-A and UE-B form a unicast communication link, UE-A is the receiving end of UE-B, UE-A can perform listening, and determine a resource set with little interference to UE-A according to the listening result, and send the resource set to UE-B. UE-B selects resources from the resource set sent by UE-A, so that the problem of hidden nodes can be avoided.

For another example, UE-A can send the time slot information selected or reserved by itself, that is, the time slot information about to perform resource transmission, to UE-B, and UE-B avoids to select the transmission resource on the slot selected or reserved by UE-A when performing resource selection, to avoid the half-duplex problem with UE-A.

The schemes provided in the embodiments of the present application are mainly used to determine the above resource set, so as to avoid at least one of the hidden node problem and the half-duplex problem. In order to facilitate the understanding of the technical solutions of the embodiments of the present application, the related technologies of the embodiments of the present application are described below. The following related technologies can be combined with the technical solutions of the embodiments of the present application as optional solutions, and all of them belong to the protection scope of the embodiments of the present application.

Figure 6:
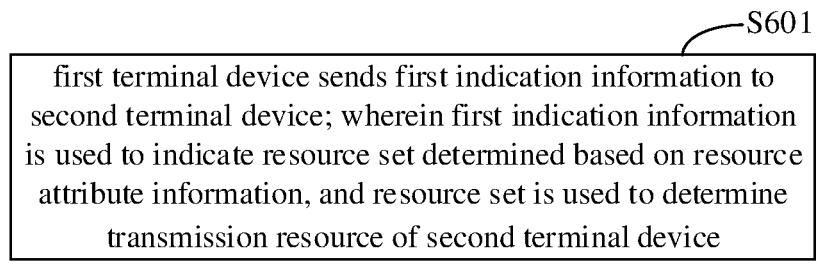
FIG. 6 is a schematic flowchart of a resource determination method according to an embodiment of the present application.

FIG. 6 is a schematic flowchart of a resource determination method according to an embodiment of the present application. The method is applied to the first terminal device, including:

S601, the first terminal device sends the first indication information to the second terminal device.

In the embodiment, the first indication information is used to indicate a resource set, the resource set is determined based on resource attribute information, and the resource set is used to determine the transmission resource of the second terminal device.

Figure 7:
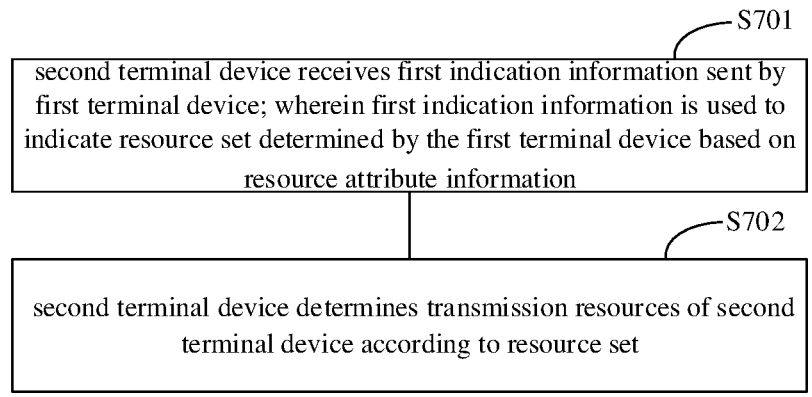
FIG. 7 is a schematic flowchart of a resource determination method according to another embodiment of the present application.

Correspondingly, the second terminal device determines the transmission resource based on the above resource set. Specifically, FIG. 7 is a schematic flowchart of a resource determination method according to another embodiment of the present application. The method is applied to the second terminal device, including:

S701, the second terminal device receives the first indication information sent by the first terminal device; wherein, the first indication information is used to indicate a resource set; the resource set is determined by the first terminal device based on resource attribute information; and S702, the second terminal device determines transmission resources of the second terminal device according to the resource set.

Exemplarily, the first indication information may be carried by the SCI, the medium access control layer control element (MAC CE) or the sidelink (PC5) radio resource control (RRC) signal. The first indication information may indicate a resource set or index information of the resource set. For example, the first indication information may include indexes of each first resource in the resource set.

Exemplarily, the foregoing resource set includes at least one first resource. The first resource may be a resource selectable by the second terminal device for transmission. The first resource in the resource set is, for example, a resource with little interference to the first terminal device, and the second terminal device selects the first resource in the resource set as the transmission resource, which can avoid the hidden node problem. Alternatively, the first resource may be a transmission resource reserved by the first terminal device, and the second terminal device avoids selecting the transmission resource on the time slot where the first resource is located in the resource set, which can avoid the half-duplex problem.

It can be seen that, according to the resource determination method of the embodiment of the present application, the first terminal device determines the resource set based on the resource attribute information, and sends the first indication information for indicating the resource set to the second terminal device, so that the second terminal device can determine transmission resources according to the resource set, to improve data transmission quality.

In the embodiment, the resource set is determined based on resource attribute information. Optionally, the resource attribute information includes at least one of the following:

the quantity of the first resource included in the resource set; and the granularity of the first resource included in the resource set.

Optionally, the resource determination method provided in the embodiment of the present application further includes a step of determining the above resource attribute information. Examples are as follows:

Example 1: the first terminal device determines the quantity of the first resources included in the resource set according to second indication information.

In this example, multiple optional configuration modes of the second indication information are provided.

Optionally, the second indication information is preconfigured.

For example, the second indication information is in the resource pool configuration information of the first terminal device, and the resource pool configuration information is preconfigured.

Optionally, the second indication information is determined according to the first configuration information sent by the network device.

For example, the first terminal device receives the first configuration information sent by the network device, and the first configuration information includes the second indication information.

In the embodiment, the first configuration information may include at least one of the following:

A System Information Block (SIB);

An RRC signaling; and

A Downlink Control Information (DCI).

Optionally, the second indication information is sent by other terminal device except the first terminal device in the communication group where the first terminal device is located.

Exemplarily, the second indication information is sent by the group header terminal in the communication group where the first terminal device is located.

Figure 8:
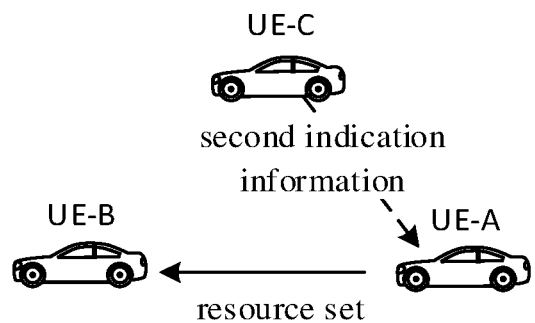
FIG. 8 is a schematic diagram of a group header terminal sending second indication information according to an embodiment of the present application.

For example, as shown in FIG. 8, the first communication group includes a first terminal device UE-A, a second terminal device UE-B and a third terminal device UE-C, wherein UE-C is a group header terminal of the first communication group, UE-A and UE-B are group member terminals in the first communication group. The group header terminal UE-C has functions such as resource coordination, resource scheduling, resource allocation, or group management. The group header terminal UE-C may send the second indication information to the group member terminal UE-A, so that UE-A can determine the quantity of the first resources included in the resource set, and UE-A sends to UE-B the first indication information for indicating the resource set. The group header terminal UE-C may also send second indication information to other group member terminals such as UE-B, so that when each terminal device in the first communication group performs resource coordination, each terminal device can determine the quantity of the first resources in the resource set to be sent.

Optionally, the second indication information is sent by the second terminal device.

That is to say, in the resource determination method, the second terminal device sends the second indication information, specifically, the second terminal device sends the second indication information to the first terminal device. The second indication information is used to determine the quantity of the first resource included in the resource set.

Figure 9:
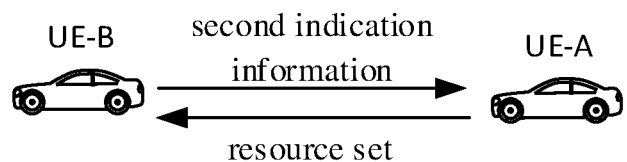
FIG. 9 is a schematic diagram of sending second indication information by a second terminal device according to an embodiment of the present application.

For example, as shown in FIG. 9, when the second terminal device UE-B needs to select resources in time slot n, UE-B sends indication information to the first terminal device UE-A to instruct UE-A to send the resource set to UE-B, and at the same time, UE-B sends second indication information to UE-A. UE-A determines the quantity of the first resource included in the resource set according to the second indication information, determines the resource set according to the quantity, and then sends the first indication information for indicating the resource set to UE-B. Optionally, the UE-A may also send the quantity of the first resource included in the resource set to the UE-B.

Exemplarily, the second instruction information and the instruction information for instructing the first terminal device UE-A to send the resource set to the second terminal device UE-B may be carried by the same signaling. That is to say, UE-B sends first signaling to UE-A, and the first signaling includes or carries the second indication information and the indication information for instructing UE-A to send a resource set to UE-B.

Exemplarily, the second indication information may be carried by at least one of the following types of information:
the first SCI;
a first MAC CE; and
a first PC5-RRC signaling.

Optionally, the first SCI may include a first-order SCI or a second-order SCI. The first-order SCI is the SCI carried in the PSCCH; and the second-order SCI is the SCI multiplexing transmission resources with the PSSCH.

In this example, the second indication information may include at least one of the following:
the quantity of the first resource included in the resource collection;
an upper limit value of the quantity of the first resource included in the resource set;
a lower limit value of the quantity of the first resource included in the resource set; and
a first ratio, wherein the first ratio is used to determine the quantity of the first resource included in the resource set.

Optionally, the second indication information directly indicates the specific number N, and the first terminal device selects N first resources according to the second indication information, for example, the N first resources with minimal interference to the first terminal device or the reserved N first resources, and a resource set is obtained based on the N first resources.

Optionally, the second indication information indicates the lower limit value or upper limit value of the first resource included in the resource set, and the first terminal device determines the resource set according to the lower limit value or upper limit value, so that the quantity of the first resource included in the resource set is greater than the lower limit value or less than the upper limit value.

The second indication information indicates the lower limit value, which can ensure that the quantity of the first resources included in the resource set is greater than the lower limit value, so that the first terminal device can provide enough first resources to the second terminal device. The second indication information indicates the upper limit value, which can ensure that the quantity of the first resources included in the resource set does not exceed the upper limit, thereby reducing signaling overhead or complexity of the first indication information.

Optionally, the first indication information indicates a first ratio or percentage. The first ratio is related to the quantity of the first resource included in the resource set.

Exemplarily, the first ratio is a ratio between the quantity of the first resources included in the resource set and the quantity of the first resources in the first time-frequency range. Then, the first ratio is specifically used to determine the quantity of the first resources included in the resource set according to the first ratio and the quantity of the first resources in the first time-frequency range.

Correspondingly, the first terminal device determining the quantity of the first resources included in the resource set according to the second indication information, including:
determining, by the first terminal device, the quantity of the first resources included in the resource set according to the first ratio and the quantity of the first resources in the first time-frequency range.

For example, the first terminal device determines the quantity of first resources included in the resource set $N=\text{ceil}(Y*M)$, or $N=\text{floor}(Y*M)$ according to the first ratio Y and the number M of first resources in the first time-frequency range, where $\text{ceil}(X)$ means rounding up X, and $\text{floor}(X)$ means rounding down X.

Exemplarily, the first time-frequency range may be a time-frequency range determined by the first terminal device, for example, a time-frequency range configured in advance or determined according to configuration information of the network device.

Optionally, the first time-frequency range includes a resource selection window of the first terminal device.

For example, the first terminal device UE-A selects transmission resources in the resource selection window of UE-A, wherein the time slot range of the resource selection window is [ n+1,n+100], and each time slot includes 8 first resources. If the first time-frequency range is the resource selection window of UE-A, the number of first resources in the first time-frequency range $M=800$. When the second terminal device UE-B sends the second indication information to UE-A, and the second indication information contains the first ratio $Y=0.1$ or $Y=10\%$, UE-A determines the quantity of the first resource included in the resource set send to UE-B is $N=\text{ceil}(Y*M)=80$.

Exemplarily, the first time-frequency range may also be determined according to third indication information sent by the second terminal device. That is to say, the resource determination method may further include: the second terminal device sending third indication information, specifically, the second terminal device sending the third indication information to the first terminal device. Wherein, the third indication information includes the first time-frequency range or is used to determine the first time-frequency range.

Optionally, the first time-frequency range may include a resource selection window of the second terminal device.

For example, the second terminal device UE-B selects resources in the resource selection window of UE-B. The second terminal device UE-B sends to the first terminal device UE-A the second indication information and the indication information for instructing UE-A to send the resource set to UE-B, wherein the second indication information includes the first ratio Y. In addition, UE-B also sends third indication information including the resource selection window of UE-B to U EA. UE-A performs resource selection within the resource selection window sent by UE-B, and determines the number N=ceil(M*Y) of elements in the resource set sent to UE-B according to the total number of resources M and the ratio Y in the resource selection window.

Exemplarily, at least two of the indication information sent by the second terminal device for instructing UE-A to send the resource set to UE-B, the second indication information and the third indication information may be carried by the same signaling. For example, the second indication information and the third indication information are carried in one signaling, and the signaling indicates both the first ratio and the first time domain range.

Further, the resource determination method may also include:

when the number of available resources in the first time-frequency range is less than the number of first resources included in the resource set, increasing the RSRP threshold corresponding to the available resources.

Exemplarily, the available resource is the first resource meeting the predetermined condition within the first time-frequency range; and the predetermined condition is related to the RSRP threshold. For example, the predetermined condition includes that the RSRP measurement result associated with the first resource is less than or equal to the RSRP threshold, where the RSRP measurement result associated with the first resource is the RSRP measurement result of the transmission resource corresponding to the first resource within the listening window.

For example, the first terminal device UE-A determines available resources of UE-A in the resource selection window according to the listening result in the listening window. Specifically, the UE-A measures the RSRP of the PSCCH detected within the listening window and the PSSCH scheduled by the PSCCH. If the measured RSRP is higher than the RSRP threshold, and according to the reservation information in the PSCCH, it is determined that there is a resource conflict between the transmission resources reserved in the resource selection window and the data to be transmitted of the terminal device, UE-A determines that the transmission resource reserved in the resource selection window is not an available resource. If the quantity of available resources determined based on all listening results is less than X times the total resource quantity M of the resource selection window (wherein, 0<X<1, for example, X is 20%, 30% or 50%, etc.), then the threshold value of RSRP is increased, and the available resources is re-determined according to the listening result until the number of available resources is greater than or equal to X*M. In practical implementations, if the second indication information is configured with the first ratio Y, when the UE-A determines the resource set to be sent to the second terminal device UE-B, it determines the quantity N=ceil(Y*M) of the first resource included in the resource set according to Y. Wherein, if the number of available resources is less than ceil(Y*M), UE-A will increase the RSRP threshold, for example, by 3 dB, and re-determine the available resources according to the listening results until the number of available resources is greater than or equal to ceil(Y*M).

Based on the foregoing manner, it can be ensured that the first terminal device can provide sufficient first resources to the second terminal device.

In this example, the first terminal device determines the quantity of the first resources included in the resource set according to the second indication information. By flexibly setting the configuration mode of the second indication information and the content contained in the second indication information, requirements in different application scenarios can be met.

Example 2: The first terminal device determines the quantity of the first resources included in the resource set according to the first parameter information.

Optionally, the first parameter information includes at least one of the following:

a priority; and a channel busy ratio (CBR).

Optionally, the priority is pre-configured, determined according to the second configuration information sent by the network device, determined according to the fourth indication information sent by the second terminal device, or determined according to the priority of the first sidelink data of the first terminal device.

For example, a default priority is configured in the resource pool configuration information of the first terminal device, and the first terminal device determines the quantity of first resources included in the resource set according to the default priority.

In another example, the first terminal device receives the second configuration information sent by the network device or the fourth indication information sent by the second terminal device, wherein the second configuration information or the fourth indication information includes the priority. The first terminal device determines the quantity of the first resources included in the resource set according to the priorities included in the second configuration information or the fourth indication information.

Correspondingly, the resource determination method also includes:

The second terminal device sends fourth indication information, wherein the fourth indication information includes the priority, and the priority is used to determine the quantity of the first resources included in the resource set.

In the embodiment, the second configuration information may be the SIB, RRC signaling or DCI and so on. The fourth indication information may be borne by the SCI, MAC CE, or PC5-RRC.

Optionally, the CBR is measured by the first terminal device, pre-configured, or determined according to third configuration information sent by the network device.

For example, a default CBR value is configured in the resource pool configuration information of the first terminal device.

If the first terminal device measures the CBR measurement value, the first terminal device determines the quantity of the first resources included in the resource set according to the CBR measurement value.

If the first terminal device cannot measure the CBR measurement value, the first terminal device determines the quantity of the first resources included in the resource set according to the default CBR value.

In another example, the first terminal device receives third configuration information sent by the network device, wherein the third configuration information includes the CBR. The first terminal device determines the quantity of the first resources included in the resource set according to the CBR included in the third configuration information.

Exemplarily, the first parameter information has a corresponding relationship with at least one of the following:

the quantity of the first resource included in the resource set;

an upper limit value of the quantity of the first resource included in the resource set;

a lower limit value of the quantity of the first resource included in the resource set;

a first ratio, wherein the first ratio is used to determine the quantity of the first resource included in the resource set.

For example, there is a first correspondence between the first parameter information and the quantity of the first resources included in the resource set, then the first terminal device determines the quantity of the first resources included in the resource set according to the first parameter information and the first correspondence.

In another example, the first parameter information has a second corresponding relationship with the upper limit value or lower limit value of the quantity of the first resources included in the resource set, and the first terminal device determines the upper limit value or lower limit value according to the first parameter information and the first corresponding relationship, and then determines the quantity of the first resource included in the resource set according to the upper limit value or the lower limit value.

For another example, the first parameter information and the first ratio have a third corresponding relationship, then the first terminal device determines the first ratio according to the first parameter information and the third corresponding relationship, and then determines the quantity of the first resources included in the resource set according to the first ratio. For the function and acquisition method of the first ratio, reference may be made to the description in the first example above, and details are not repeated here.

Exemplarily, the first correspondence, the second correspondence and the third correspondence are determined according to preconfigured information, according to network configuration information, or according to indication information of the second terminal device.

Hereinafter, taking the first corresponding relationship exists between the first parameter information and the quantity of first resources included in the resource set as an example, the process for the first terminal device to determine the quantity of first resources included in the resource set according to the first parameter information will be described.

For example, the network device configures for the first terminal device the first corresponding relationship between the priority P and the quantity N of first resources included in the resource set. The first corresponding relationship is shown in Table 1:

TABLE 1

| Priority P | 0 | 1 | 2 | 3 | 4 | 5 | 6 | 7 |
|---|---|---|---|---|---|---|---|---|
| Quantity N | 64 | 32 | 24 | 16 | 12 | 8 | 6 | 4 |

Based on the table 1, in the case of priority P=0, the first terminal device determines that the quantity of first resources contained in the resource set is N=64, in the case of priority P=1, the first terminal device determines N=32, and so on.

In another example, the network device configures for the first terminal device the first correspondence between the CBR and the quantity N of first resources included in the resource set. The first corresponding relationship is shown in Table 2:

TABLE 2

| | CBR range | | | |
|---|---|---|---|---|
| | CBR < 0.2 | 0.2 ≤ CBR < 0.5 | 0.5 ≤ CBR < 0.8 | 0.8 ≤ CBR |
| Quantity N | 64 | 32 | 24 | 16 |

Based on table 2, when the CBR measurement value is 0.1 (that is, CBR<0.2), the first terminal device determines that the quantity of first resources included in the resource set is N=64; when the CBR measurement value is 0.3 (that is, 0.2<=CBR<0.5), first terminal device determines N=32, and so on.

For another example, the network device configures the first terminal device with a first correspondence among the priority, the CBR, and the quantity N of first resources included in the resource set. The first corresponding relationship is shown in Table 3:

TABLE 3

| | Quantity N priority | | | | | | | |
|---|---|---|---|---|---|---|---|---|
| CBR range | 0 | 1 | 2 | 3 | 4 | 5 | 6 | 7 |
| CBR <0.2 | 64 | 32 | 24 | 16 | 12 | 8 | 6 | 4 |
| 0.2 <= CBR < 0.5 | 32 | 24 | 16 | 12 | 8 | 6 | 4 | 2 |
| 0.5 <= CBR < 0.8 | 24 | 16 | 12 | 8 | 6 | 4 | 2 | 2 |
| 0.8 <= CBR | 16 | 12 | 8 | 6 | 4 | 2 | 2 | 1 |

Based on table 3, when the priority is 0 and the CBR measurement value is 0.1 (that is, CBR<0.2), the first terminal device determines that the quantity of first resources included in the resource set is N=64; when the priority is 1 and the CBR measurement value is 0.1 (that is, CBR<0.2), the terminal device determines that the quantity of first resources included in the resource set is N=32, and so on.

In this example, the first terminal device determines the quantity of the first resources included in the resource set according to the first parameter information, which can save signaling overhead to a certain extent.

Example 3: The first terminal device determines the granularity of the first resource included in the resource set according to the fifth indication information.

Exemplarily, the granularity of the first resource includes K resource blocks (RB), P sub-channels or Q time slots; wherein, K, P and Q are all positive integers. That is to say, according to the fifth indication information, the first terminal device determines the first resource in the resource set with the granularity (or unit) of K RBs, the granularity of P sub-channels, or the granularity of Q time slots, wherein each sub-channel includes a plurality of consecutive RBs.

In the embodiment, the K RBs can also be called RBG (RB group). For example, the K RBs in the same RBG are continuous RBs.

Optionally, the fifth indication information is preconfigured or determined according to fourth configuration information sent by the network device; or, the fifth indication information is sent by the second terminal device.

Exemplarily, the fifth indication information is configured in the resource pool configuration information of the first terminal device.

Exemplarily, the first terminal device receives the fourth configuration information sent by the network device, wherein the fourth configuration information includes the fifth indication information. Wherein, the fourth configuration information may be semi-static configuration information. The fourth configuration information may be the SIB, RRC signaling or DCI, etc.

Exemplarily, the first terminal device receives the fifth indication information sent by the second terminal device. That is to say, the resource determination method may further include: the second terminal device sending the fifth indication information, wherein the fifth indication information is used to determine the granularity of the first resource included in the resource set.

Optionally, when the second terminal device sends the second indication information or the fourth indication information and indicates the resource quantity in the resource set, if the second terminal device sends the fifth indication information indicating the resource granularity in the resource set, then the second indication information or the fourth indication information may be carried by the same signaling as the fifth indication information, that is, both the quantity and the granularity are indicated in one signaling.

Exemplarily, the fifth indication information is carried by at least one of the following types of information: the second SCI; the second MAC CE; and the second PC5-RRC signaling. For example, the second terminal device UE-B sends fifth indication information to the first terminal device UE-A, wherein the fifth indication information indicates that the granularity of the first resource contained in the resource set sent by UE-A is a single time slot. UE-A determines the resource set according to the fifth indication information, and sends first indication information to UE-B, wherein the first indication information is used to indicate the resource set, and specifically, the first indication information indicates a time slot index. For example, the time slot corresponding to the time slot index is the time slot corresponding to the transmission resource selected or reserved by UE-A, UE-A sends the time slot index to UE-B, UE-B can avoid selecting resources on the corresponding time slot, thereby avoiding the half-duplex problem with UE-A.

For another example, when UE-B is expected to receive the data to be transmitted, and the data to be transmitted needs to occupy K subbands, UE-B needs to perform resource selection, and UE-B can send to UE-A the fifth indication information and the indication information to instruct UE-A to send the resource set to UE-B. The fifth indication information indicates that the granularity of the first resource included in the resource set is a sub-channel set or a sub-channel group, RBG, including K sub-channels. The UE-A determines a resource set with K sub-channels as a granularity or unit, and the resource set includes multiple sub-channel sets, and each sub-channel set includes K sub-channels. The first terminal device sends the resource set to UE-B. UE-B selects a sub-channel set from the resource set.

In this example, the first terminal device determines the granularity of the first resource contained in the resource set according to the fifth indication information, which is helpful for the first terminal device to determine a resource set more suitable for the second terminal device and improve transmission quality.

Optionally, the resource determination method may include:

The first terminal device sends the sixth indication information to the second terminal device; wherein the sixth indication information is used to indicate resource attribute information, such as the quantity and/or granularity of the first resources included in the resource set.

Correspondingly, the second terminal device receives the sixth indication information sent by the first terminal device.

Optionally, the sixth indication information is carried by at least one of the following types of information: the third SCI, the third MAC CE, and the third PC5-RRC.

For example, the first terminal device UE-A determines the quantity and/or granularity of the first resources included in the resource set according to the resource pool configuration information or the configuration information sent by the network device. The UE-A sends the first indication information for indicating the resource set to the second terminal device UE-B, and sends the sixth indication information to UE-B, so that UE-B can determine each first resource in the resource set from the first indication information. Specifically, the first indication information indicates that the resource set includes the first one first resource and the second one first resource in the resource selection window of the UE-B, and the sixth indication information indicates that the granularity of the first resource is 5 RBs. If there are 5 RBs on each time slot in the resource selection window [n+1, n+12] in UE-B, then UE-B can determine that each first resource in the resource set is the 5 RBs on time slot n+1 and the 5 RBs on time slot n+2. Optionally, the first indication information and the sixth indication information sent by UE-A to UE-B are carried by the same signaling, that is, in one signaling, both the resource set and the resource granularity and/or resource quantity in the resource set are indicated.

The above describes the specific configuration and implementation of the embodiments of the present application from different perspectives through multiple embodiments. Using at least one of the above embodiments, the first terminal device determines the resource set based on the resource attribute information, and sends the first indication information for indicating the resource set to the second terminal device, so that the second terminal device can determine the transmission resource according to the resource set, improving data transmission quality.

Figure 10A:
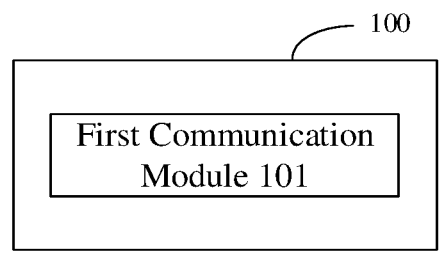
FIG. 10A is a schematic structural block diagram of a first terminal device according to an embodiment of the present application.

Corresponding to the processing method in at least one of the foregoing embodiments, this embodiment of the present application further provides a first terminal device. FIG. 10A shows a schematic structural block diagram of a first terminal device provided by an embodiment of the present application. Referring to FIG. 10A, the first terminal device includes:

A first communication module 101, configured to send first indication information to a second terminal device.

In the embodiment, the first indication information is used to indicate a resource set, the resource set is determined based on resource attribute information, and the resource set is used to determine transmission resource of the second terminal device.

Optionally, the resource attribute information includes at least one of:

a quantity of first resources included in the resource set; and a granularity of the first resources included in the resource set.

Figure 10B:
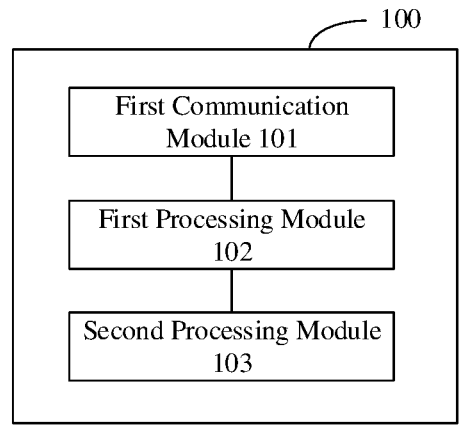
FIG. 10B is a schematic structural block diagram of a first terminal device according to another embodiment of the present application.

FIG. 10B illustrates a schematic structural block diagram of a terminal device provided by another embodiment of the present application. Optionally, referring to FIG. 10B, the first terminal device further includes:

a first processing module 102, configured to determine the quantity of the first resources included in the resource set according to the second indication information or first parameter information.

Optionally, the second indication information is pre-configured.

Optionally, the second indication information is determined according to first configuration information sent by a network device.

Optionally, the first configuration information includes at least one of:
  system information block SIB;
  radio resource control RRC signaling; and
  downlink control information DCI.

Optionally, the second indication information is sent by other terminal device except the first terminal device in a communication group where the first terminal device is located, or, the second indication information is sent by the second terminal device.

Optionally, the second indication information is carried by at least one of following types of information:
  first sidelink control information SCI;
  a first media access layer control unit MAC CE; and
  a first sidelink radio resource control PC5-RRC signaling.

Optionally, the second indication information includes at least one of:
  the quantity of first resources included in the resource set;
  an upper limit value of the quantity of the first resource included in the resource set;
  a lower limit value of the quantity of the first resource included in the resource set; and
  a first ratio, wherein the first ratio is used to determine the quantity of the first resources included in the resource set.

Optionally, the first processing module 102 is configured to determine the quantity of the first resources included in the resource set according to the first ratio and the quantity of the first resources in a first time-frequency range.

Optionally, the first time-frequency range includes a resource selection window of the first terminal device.

Optionally, the first time-frequency range is determined according to third indication information sent by the second terminal device.

Optionally, the first time-frequency range includes a resource selection window of the second terminal device.

Optionally, the first processing module 102 is further configured to:
  in a case that a quantity of an available resource in the first time-frequency range is less than the quantity of the first resources included in the resource set, increasing an RSRP threshold corresponding to the available resource
  wherein, the available resource is a first resource meeting a predetermined condition within the first time-frequency range; and the predetermined condition is related to the RSRP threshold.

Optionally, the first parameter information includes at least one of:
  a priority; and
  a channel busy ratio CBR.

Optionally, the priority is pre-configured, determined according to second configuration information sent by a network device, determined according to fourth indication information sent by the second terminal device, or determined according to a priority of first sidelink data of the first terminal device.

Optionally, the CBR is measured by the first terminal device, pre-configured, or determined according to third configuration information sent by a network device.

Optionally, the first parameter information has a corresponding relationship with at least one of:
  the quantity of first resources included in the resource set;
  an upper limit value of the quantity of the first resource included in the resource set;
  a lower limit value of the quantity of the first resource included in the resource set; and
  a first ratio, wherein the first ratio is used to determine the quantity of the first resources included in the resource set.

Optionally, referring to FIG. 10B, the first terminal device further includes:
  a second processing module 103, configured to determine the granularity of the first resource included in the resource set according to fifth indication information.

Optionally, the fifth indication information is pre-configured or determined according to fourth configuration information sent by a network device; or, the fifth indication information is sent by the second terminal device.

Optionally, the fifth indication information is carried by at least one of following types of information:
  second SCI;
  a second MAC CE; and
  a second PC5-RRC signaling.

Optionally, the granularity of the first resource includes K resource blocks RB, P subchannels or Q time slots; wherein K, P and Q are positive integers.

Optionally, the first communication module 101 is further configured to:
  send sixth indication information to the second terminal device; wherein the sixth indication information is used to indicate the resource attribute information.

Optionally, the sixth indication information is carried by at least one of following types of information:
  third SCI;
  a third MAC CE; and
  a third PC5-RRC.

The first terminal device 100 in the embodiment of the present application can realize the corresponding functions of the first terminal device in the foregoing method embodiments, and for the processes, functions, implementations and advantage effects corresponding to each module (submodule, unit or component, etc.) in the first terminal device 100, reference may be made to the corresponding descriptions in the foregoing method embodiments, and details are not repeated here.

It should be noted that the functions described by the various modules (submodules, units or components, etc.) in the first terminal device 100 in the embodiment of the present application may be implemented by different modules (submodules, units or components, etc.), or may be realized by the same module (submodule, unit or component, etc.), for example, the first processing module 102 and the second processing module 103 can be different modules or the same module, both of which can realize the corresponding functions of the first terminal device in the embodiment.

Figure 11:
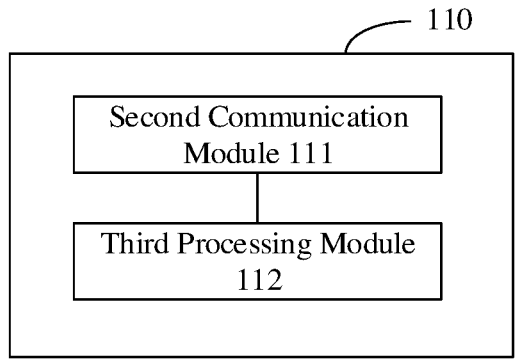
FIG. 11 is a schematic structural block diagram of a second terminal device according to an embodiment of the present application.

Corresponding to the processing method in at least one of the foregoing embodiments, this embodiment of the present application further provides a second terminal device 110, referring to FIG. 11, the second terminal device 110 includes:
  a second communication module 111, configured to receive first indication information sent by a first terminal device; wherein, the first indication information is used to indicate a resource set; the resource set is determined by the first terminal device based on resource attribute information; and a third processing module 112, configured to determine a transmission resource of the second terminal device according to the resource set.

Optionally, the second communication module 111 is further configured to:

send second indication information, wherein the second indication information is used to determine a quantity of the first resources included in the resource set.

Optionally, the second indication information is carried by at least one of following types of information:

first SCI;

a first MAC CE; and a first PC5-RRC signaling.

Optionally, the second indication information includes at least one of:

the quantity of the first resources included in the resource set;

an upper limit value of the quantity of the first resource included in the resource set;

a lower limit value of the quantity of the first resource included in the resource set; and a first ratio, wherein the first ratio is used to determine the quantity of the first resources included in the resource set.

Optionally, the first ratio is used to determine the quantity of the first resources included in the resource set according to the first ratio and the quantity of the first resources in a first time-frequency range.

Optionally, the second communication module 111 is further configured to:

send third indication information, wherein the third indication information includes the first time-frequency range.

Optionally, the first time-frequency range includes a resource selection window of the second terminal device.

Optionally, the second communication module 111 is further configured to:

send fourth indication information, wherein the fourth indication information includes a priority, and the priority is used to determine the quantity of the first resources included in the resource set.

Optionally, the second communication module 111 is further configured to:

send fifth indication information, wherein the fifth indication information is used to determine the granularity of the first resource included in the resource set.

Optionally, the fifth indication information is carried by at least one of following types of information:

second SCI;

a second MAC CE; and a second PC5-RRC signaling.

Optionally, the second communication module 111 is further configured to:

receive sixth indication information sent by the first terminal device; wherein the sixth indication information is used to indicate the resource attribute information.

Optionally, the sixth indication information is carried by at least one of following types of information:

third SCI;

a third MAC CE; and a third PC5-RRC signaling.

The second terminal device 110 in the embodiment of the present application can realize the corresponding functions of the second terminal device in the foregoing method embodiments, and for the processes, functions, implementations and advantage effects corresponding to each module (submodule, unit or component, etc.) in the second terminal device 110, reference may be made to the corresponding descriptions in the foregoing method embodiments, and details are not repeated here.

It should be noted that the functions described by the various modules (submodules, units or components, etc.) in the second terminal device 110 in the embodiment of the present application may be implemented by different modules (submodules, units or components, etc.), or may be realized by the same module (submodule, unit or component, etc.), for example, the second communication module 111 and the third processing module 112 can be different modules or the same module, both of which can realize the corresponding functions of the first terminal device in the embodiment.

Figure 12:
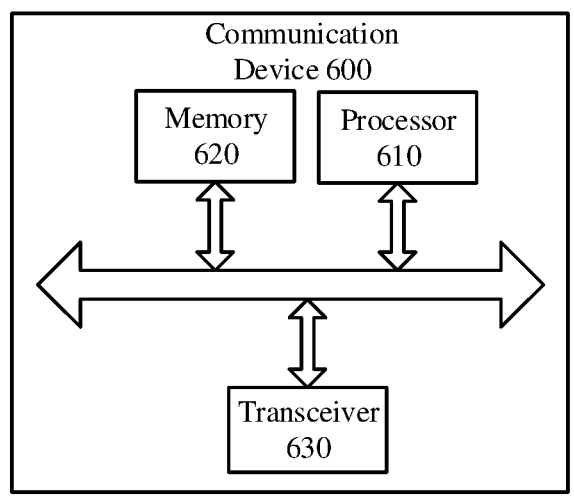
FIG. 12 is a schematic block diagram of a communication device according to an embodiment of the present application.

FIG. 12 is a schematic structural diagram of a communication device 600 according to an embodiment of the application, wherein the communication device 600 includes a processor 610, and the processor 610 can call and run a computer program from a memory to implement the method in the embodiment of the application.

Optionally, the communication device 600 may further include a memory 620. Wherein, the processor 610 can invoke and run a computer program from the memory 620, so as to implement the method in the embodiment of the present application.

In the embodiment, the memory 620 may be an independent device independent of the processor 610, or may be integrated in the processor 610.

Optionally, the communication device 600 may further include a transceiver 630, and the processor 610 may control the transceiver 630 to communicate with other devices, specifically, to send information or data to other devices, or to receive information or data sent by other devices.

In the embodiment, the transceiver 630 may include a transmitter and a receiver. The transceiver 630 may further include antennas, and the number of antennas may be one or more.

Optionally, the communication device 600 may be the first terminal device as shown in FIG. 10A or FIG. 10B according to the embodiment of the present application, and the communication device 600 may implement the method provided by the first terminal in each method of the embodiment of the present application. For the sake of brevity, the corresponding processes implemented by the device are not repeated here.

Optionally, the communication device 600 may be the second terminal device as shown in FIG. 11 in the embodiment of the present application, and the communication device 600 may implement the corresponding procedures implemented by the second terminal device in each method of the embodiment of the present application, for the sake of brevity, it is not repeated here.

Figure 13:
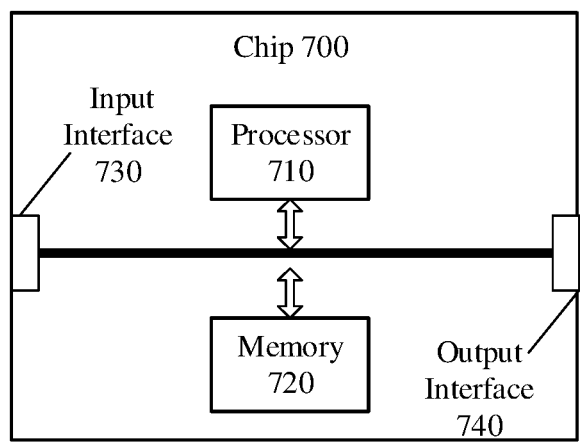
FIG. 13 is a schematic block diagram of a chip according to an embodiment of the present application.

FIG. 13 is a schematic structural diagram of a chip 700 according to an embodiment of the present application. The chip 700 includes a processor 710, and the processor 710 can invoke and run a computer program from a memory, so as to implement the method in the embodiment of the present application.

Optionally, the chip 700 may further include a memory 720. The processor 710 may invoke and run a computer program from the memory 720, so as to implement the method in the embodiment of the present application.

The memory 720 may be an independent device independent of the processor 710, or may be integrated in the processor 710.

Optionally, the chip 700 may also include an input interface 730. The processor 710 can control the input interface 730 to communicate with other devices or chips, specifically, can obtain information or data sent by other devices or chips.

Optionally, the chip 700 may also include an output interface 740. The processor 710 can control the output interface 740 to communicate with other devices or chips, specifically, can output information or data to other devices or chips.

Optionally, the chip can be applied to the first terminal device shown in FIG. 10A or FIG. 10B in the embodiments of the present application, and the chip can implement the corresponding processes implemented by the first terminal device in the methods of the embodiments of the present application. For the sake of brevity, it will not be repeated herein.

Optionally, the chip can be applied to the second terminal device of the embodiment of FIG. 11 of the present application, and the chip can implement the corresponding processes implemented by the second terminal device in the methods of the embodiments of the present application. For the sake of brevity, it will not be repeated herein.

It should be understood that the chip mentioned in the embodiment of the present application may also be referred to as a system level chip, a system chip, a chip system or a system-on-chip.

The above-mentioned processor may be a general-purpose processor, a digital signal processor (DSP), a field programmable gate array (FPGA), an application specific integrated circuit (ASIC) or other programmable logic devices, transistor logic devices, discrete hardware components and the like. The above general-purpose processor may be a microprocessor, or the processor may be any conventional processor, or the like.

The above memory may be a volatile memory or a nonvolatile memory, or may include both volatile and nonvolatile memories. Among them, the non-volatile memory can be read-only memory (ROM), programmable read-only memory (PROM), erasable programmable read-only memory (Erasable PROM, EPROM), electrically programmable Erase Programmable Read-Only Memory (Electrically EPROM, EEPROM) or Flash. The volatile memory may be Random Access Memory (RAM).

It should be understood that the above-mentioned memory is illustrative but not restrictive. For example, the memory in the embodiment of the present application may also be a static random access memory (static RAM, SRAM), a dynamic random access memory (dynamic RAM, DRAM), Synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM), etc. That is, the memory in the embodiments of the present application is intended to include, but not be limited to, these and any other suitable types of memory.

Figure 14:
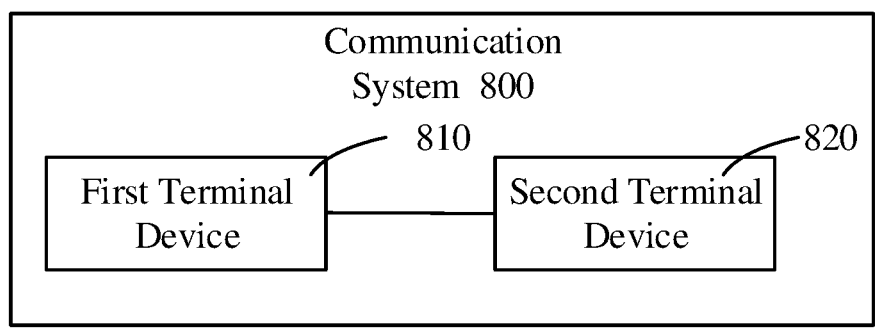
FIG. 14 is a schematic block diagram of a communication system according to an embodiment of the present application.

FIG. 14 is a schematic block diagram of a communication system 800 according to an embodiment of the present application. The communication system 800 includes a first terminal device 810 and a second terminal device 820.

The first terminal device 810 can be used to realize the corresponding functions realized by the first terminal device in the method of the embodiments of the present application; and the second terminal device 820 can be used to realize the corresponding functions realized by the second terminal device in the method of the embodiments of the present application. For the sake of brevity, details are not repeated here.

In the above embodiments, all or part of them may be implemented by software, hardware, firmware or any combination thereof. When implemented using software, it may be implemented in whole or in part in the form of a computer program product. The computer program product includes one or more computer instructions. When the computer program instructions are loaded and executed on the computer, the processes or functions according to the embodiments of the present application will be implemented in whole or in part. The computer can be a general-purpose computer, a special purpose computer, a computer network, or other programmable device. The computer instructions may be stored in or transmitted from one computer-readable storage medium to another computer-readable storage medium, for example, the computer instructions may be transferred from a website, computer, server, or data center by wire (such as coaxial cable, optical fiber, digital subscriber line (DSL)) or wireless (such as infrared, wireless, microwave, etc.) to another website site, computer, server or data center. The computer-readable storage medium may be any available medium that can be accessed by a computer, or a data storage device such as a server or a data center integrated with one or more available media. The available medium may be a magnetic medium (such as a floppy disk, a hard disk, or a magnetic tape), an optical medium (such as a DVD), or a semiconductor medium (such as a solid state disk (SSD)), etc.

It should be understood that, in various embodiments of the present application, the sequence numbers of the above-mentioned processes do not mean the order of execution, and the execution order of the processes should be determined by their functions and internal logic, and should not be used in the embodiments of the present application. The implementation process constitutes any limitation.

Those skilled in the art can clearly understand that for the convenience and brevity of the description, the specific operating process of the above-described system, device and unit can refer to the corresponding process in the foregoing method embodiment, which will not be repeated here.

The above is only the specific implementation of the application, but the scope of protection of the application is not limited thereto. Anyone familiar with the technical field can easily think of changes or substitutions within the technical scope disclosed in the application, which should be covered within the scope of protection of this application. Therefore, the protection scope of the present application should be based on the protection scope of the claims.

What is claimed is:

1. A resource determination method, comprising:
sending, by a first terminal device, first indication information to a second terminal device,
wherein, the first indication information is used to indicate a resource set, the resource set is determined based on resource attribute information, and the resource set is used to determine a transmission resource of the second terminal device, and
wherein the resource attribute information is determined by the first terminal device according to received information or pre-configured information, and wherein the resource attribute information comprises a granularity of the first resources comprised in the resource set.

2. The method according to claim 1, wherein the resource attribute information further comprises:
a quantity of first resources comprised in the resource set.

3. The method according to claim 2, wherein the method further comprises:
determining, by the first terminal device, the quantity of the first resources comprised in the resource set according to second indication information or first parameter information.

4. The method according to claim 3, wherein the first parameter information comprises
a priority,
wherein the priority is pre-configured, determined according to second configuration information sent by a network device, or determined according to fourth indication information sent by the second terminal device.

5. The method according to claim 3, wherein the first parameter information has a corresponding relationship with at least one of:
the quantity of first resources comprised in the resource set;
an upper limit value of the quantity of the first resource comprised in the resource set;
a lower limit value of the quantity of the first resource comprised in the resource set; and
a first ratio, wherein the first ratio is used to determine the quantity of the first resources comprised in the resource set.

6. The method according to claim 1, wherein the method further comprises:
determining, by the first terminal device, the granularity of the first resource comprised in the resource set according to fifth indication information.

7. The method according to claim 6, wherein the fifth indication information is pre-configured or determined according to fourth configuration information sent by a network device; or, the fifth indication information is sent by the second terminal device.

8. The method according to claim 7, wherein the fifth indication information is carried by at least one of following types of information:
second SCI;
a second MAC CE; and
a second PC5-RRC signaling.

9. The method according to claim 6, wherein the granularity of the first resource includes P subchannels; wherein P is a positive integer.

10. A resource determination method, comprising:
receiving, by a second terminal device, first indication information sent by a first terminal device; wherein, the first indication information is used to indicate a resource set; the resource set is determined by the first terminal device based on resource attribute information; and
determining, by the second terminal device, a transmission resource of the second terminal device according to the resource set,
wherein the resource attribute information is determined by the first terminal device according to received information or pre-configured information, and wherein the resource attribute information comprises a granularity of the first resources comprised in the resource set.

11. The method according to claim 10, wherein the resource attribute information further comprises a quantity of first resources comprised in the resource set, and wherein the method further comprises:
sending, by the second terminal device, second indication information, wherein the second indication information is used to determine a quantity of first resources comprised in the resource set.

12. The method according to claim 11, wherein the second indication information is carried by at least one of following types of information:
first SCI;
a first MAC CE; and
a first PC5-RRC signaling.

13. The method according to claim 11, wherein the second indication information comprises
a first ratio, wherein the first ratio is used to determine the quantity of the first resources comprised in the resource set.

14. The method according to claim 13, wherein the first ratio is used to determine the quantity of the first resources comprised in the resource set according to the first ratio and the quantity of the first resources in a first time-frequency range.

15. The method according to claim 14, wherein the method further comprises:
sending, by the second terminal device, third indication information, wherein the third indication information comprises the first time-frequency range.

16. The method according to claim 14, wherein the first time-frequency range comprises a resource selection window of the second terminal device.

17. The method according to claim 11, wherein the method further comprises:
receiving, by the second terminal device, sixth indication information sent by the first terminal device; wherein the sixth indication information is used to indicate the resource attribute information.

18. The method according to claim 17, wherein the sixth indication information is carried by at least one of following types of information:
third SCI;
a third MAC CE; and
a third PC5-RRC signaling.

19. A first terminal device, comprising: a processor and a memory, wherein the memory is configured to store a computer program, and the processor is configured to invoke and run the computer program stored in the memory, to:
send first indication information to a second terminal device,
wherein, the first indication information is used to indicate a resource set, the resource set is determined based on resource attribute information, and the resource set is used to determine a transmission resource of the second terminal device, and
wherein the resource attribute information is determined by the first terminal device according to received information or pre-configured information, and wherein the resource attribute information comprises a granularity of the first resources comprised in the resource set.

20. A second terminal device, comprising: a processor and a memory, wherein the memory is configured to store a computer program, and the processor is configured to invoke and run the computer program stored in the memory, to:
receive first indication information sent by a first terminal device; wherein, the first indication information is used to indicate a resource set; the resource set is determined by the first terminal device based on resource attribute information; and determine a transmission resource of the second terminal device according to the resource set, wherein the resource attribute information is determined by the first terminal device according to received information or pre-configured information, and wherein the resource attribute information comprises a granularity of the first resources comprised in the resource set.

* * * * *